(12) United States Patent
Higashimura et al.

(10) Patent No.: US 7,804,218 B2
(45) Date of Patent: Sep. 28, 2010

(54) ROTATING ELECTRICAL MACHINE WINDING, ROTATING ELECTRICAL MACHINE, AND SEMICONDUCTIVE INSULATING COMPONENT USED THEREIN

(75) Inventors: Yutaka Higashimura, Hitachi (JP); Yoshimi Kurahara, Hitachi (JP); Hiroshi Miyao, Hitachinaka (JP); Keiji Suzuki, Hitachi (JP); Mitsuru Onoda, Takahagi (JP); Nobuaki Tanaka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 342 days.

(21) Appl. No.: 11/936,119

(22) Filed: Nov. 7, 2007

(65) Prior Publication Data

US 2008/0106157 A1    May 8, 2008

(30) Foreign Application Priority Data

Nov. 7, 2006    (JP) .............................. 2006-301467

(51) Int. Cl.
*H02K 3/34* (2006.01)
(52) U.S. Cl. ...................................... 310/215; 310/196
(58) Field of Classification Search ................. 310/214, 310/215, 195, 196; 174/102 SC, 120 R, 120 SC, 174/127
See application file for complete search history.

(56) References Cited

U.S. PATENT DOCUMENTS

| | | | | |
|---|---|---|---|---|
| 3,051,771 | A | * | 8/1962 | Lee .............................. 174/36 |
| 5,030,870 | A | | 7/1991 | Wichmann |
| 5,574,325 | A | | 11/1996 | von Musil et al. |
| 5,945,764 | A | | 8/1999 | Bendfeld |
| 6,130,495 | A | | 10/2000 | Schulten et al. |
| 6,130,496 | A | * | 10/2000 | Takigawa et al. ............ 310/196 |
| 6,140,733 | A | | 10/2000 | Wedde et al. |

FOREIGN PATENT DOCUMENTS

| | | |
|---|---|---|
| DE | 1118290 | 11/1961 |
| JP | 11-509399 | 8/1999 |
| WO | WO 00/42695 | 7/2000 |

\* cited by examiner

*Primary Examiner*—Dang D Le
(74) *Attorney, Agent, or Firm*—Antonelli, Terry, Stout & Kraus, LLP.

(57) ABSTRACT

When a rotating electrical machine winding is inserted into a slot with a protective insulation intervening between them, a semiconductive insulating layer is lap-wound between an interlayer insulating layer of the rotating electrical machine winding and the protective insulation, the semiconductive insulating layer being formed by center-folding a continuous semiconductive sheet in the longitudinal direction. A thermal stress relaxation layer is provided inside the center-folded continuous semiconductive sheet so that thermal stress exerted in thickness direction of the insulating layers is absorbed.

19 Claims, 6 Drawing Sheets

ROTATING ELECTRICAL MACHINE WINDING, ROTATING ELECTRICAL MACHINE, AND SEMICONDUCTIVE INSULATING COMPONENT USED THEREIN

CLAIM OF PRIORITY

The present application claims priority from Japanese application serial No. 2006-301467, filed on Nov. 11, 2006, the content of which is hereby incorporated by reference into this application.

FIELD OF THE INVENTION

The present invention relates to a rotating electrical machine winding and a rotating electrical machine as well as a semiconductive insulating component used in them and, more particularly, to a rotating electrical machine winding and rotating electrical machine that are suitable when insulation resin is grobal impregnated into a rotating electrical machine core in which a rotating electrical machine winding is included as well as a semiconductive insulating component used therein.

BACKGROUND OF THE INVENTION

When a rotating electrical machine winding is seated in a slot formed in a rotating electrical machine core in a rotating electrical machine, such as an induction motor or electric generator, that is rated at higher than 3 kV, the groundwall insulating layer is usually covered with a protective insulation made of a semiconductive material with a surface resistivity of about 1 kΩ so that the groundwall insulating layer is not damaged.

Insulation resin is grobal impregnated into the rotating electrical machine winding structured as described above in, for example, a vacuum state, while being disposed in the slot in the rotor core. When the impregnated insulation resin is then cured, the insulation of the rotating electrical machine winding is assured and no clearance is left between the winding and the core of the rotating electrical machine.

Since the rotating electrical machine winding and rotating electrical machine core have different coefficients of thermal expansion, thermal stress occurs between them during the curing of the impregnated insulation resin. Due to this thermal stress, peeling or a crack occurs in a vulnerable part on either of the groundwall insulating layer and protective insulation.

To address this problem, a semiconductive insulating layer with a separated layer between two components is proposed in, for example, Japanese International patent publication No. 11-509399 (Family: U.S. Pat. No. 5,945,764), which is formed near the rotating electrical machine core of a rotating electrical machine.

SUMMARY OF THE INVENTION

According to the technology disclosed in Patent Document above, even if peeling or a crack occurs in the separated layer, the interior of the semiconductive insulating layer is kept at approximately the same potential, so a corona discharge, which would otherwise rapidly deteriorate the insulation resin, does not occur at the peeled part or crack.

In this semiconductive insulating layer, however, even when the two components are lap-wound, they become discontinuous because of the presence of the separated layer. It is unavoidable that a difference in potential occurs due to peeling or another defect caused in the discontinuous part. As a result, corona discharges cannot be suppressed completely.

When the rotating electrical machine is operated, the rotating electrical machine winding undergoes vibration due to an electromagnetic force exerted in the depth direction of the slot. The rotating electrical machine winding is partially supported by the rotating electrical machine core through the semiconductive insulating layer including a discontinuous part against the vibration force. Since the supporting force is small and the electromagnetic force is repeated, however, the rotating electrical machine is supported unstably, resulting in vibration, noise, or insulation resin damage.

An object of the present invention is to provide a rotating electrical machine winding that can not only prevent corona discharges attributable to peeling and cracks that occur during the curing of insulation resin but also can be supported stably against an electromagnetic force, as well as a rotating electrical machine that uses the rotating electrical machine winding.

To achieve the above object, in a rotating electrical machine in which a rotating electrical machine winding is formed by providing a groundwall insulating layer around the outer periphery of an inter-layer insulating layer disposed on a coil conductor, the rotating electrical machine winding is inserted into a slot formed in a rotating electrical machine core with a protective insulation intervening therebetween, a wedge is inserted on an opening side of the slot so as to fix the rotating electrical machine winding, insulation resin is grobal impregnated into the rotating electrical machine winding and rotating electrical machine core, and the impregnated insulation resin is cured: a semiconductive insulating layer is formed by wrapped taping a continuous semiconductive sheet, which is center-folded in the longitudinal direction, between the inter-layer insulating layer and the protective insulation; and a thermal stress relaxation layer is formed inside the center-folded semiconductive sheet, the thermal stress relaxation layer relaxation thermal stress exerted in the thickness direction of the insulating layers.

In the structure described above, even if peeling or a crack occurs in the semiconductive insulating layer due to thermal stress during the curing of the impregnated insulation resin, the same electric potential is kept in the semiconductive insulating layer because an electric connection is established by wrapped taping a center-folded continuous semiconductive sheet. Accordingly, corona discharges can be suppressed, which would otherwise be caused by peeling or a crack in the semiconductive insulating layer.

The semiconductive insulating layer is mechanically continuous because it is formed by lap-winging a continuous semiconductive sheet, which is center-folded in the longitudinal direction, so the rotating electrical machine winding is supported by the rotating electrical machine core through the continuous semiconductive insulating layer. The supporting force is thereby large and stable. It then becomes possible to obtain a rotating electrical machine winding that can be supported stably against an electromagnetic force and a rotating electrical machine using the rotating electrical machine winding.

DESCRIPTION OF THE PREFERRED EMBODIMENTS

A first embodiment of the inventive rotating electrical machine will be described as for the power generator shown in FIGS. 1 to 3.

Figure 3:
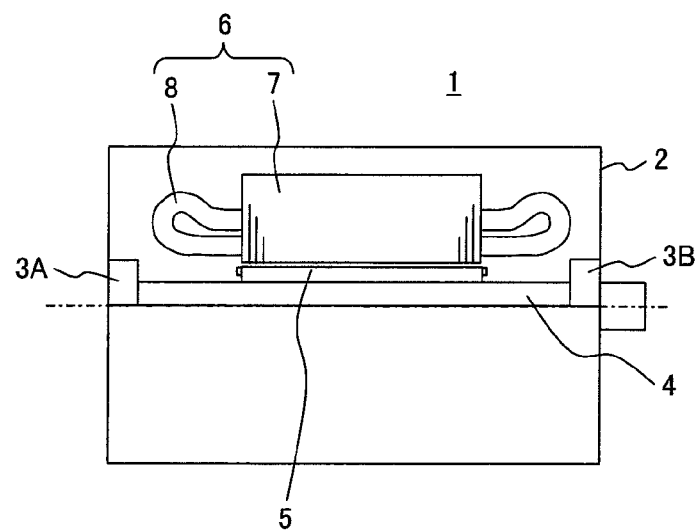
FIG. 3 is a schematic vertical cross-sectional view showing part of a power generator used as the inventive rotating electrical machine.

As shown in FIG. 3, the power generator 1 comprises a housing 2, a rotational axis 4 that is rotatably supported by the housing 2 through bearings 3A and 3B, a rotor 5 that is supported by the rotational axis 4 and has magnetic poles, and a stator 6 that is disposed opposite to the rotor 5 with a spacing left therebetween in the peripheral direction.

The stator 6 comprises a stator core 7 supported by the housing 2 and a stator winding 8 formed on the stator core 7.

In this embodiment and other embodiments described later, the stator core 7 and stator winding 8 correspond to the rotating electrical machine core and rotating electrical machine winding in the present invention, respectively.

The stator core 7 has a plurality of slots 7G spaced at equal intervals in the peripheral direction over the entire length of the stator core 7, from the inner diameter side facing the rotor 5 to the outer diameter side, a wedge groove 7A being formed on an opening side of the slot 7G. A wedge 7W is inserted into the wedge groove 7A so as to fix the stator winding 8 seated in the slot 7G.

Figure 1:
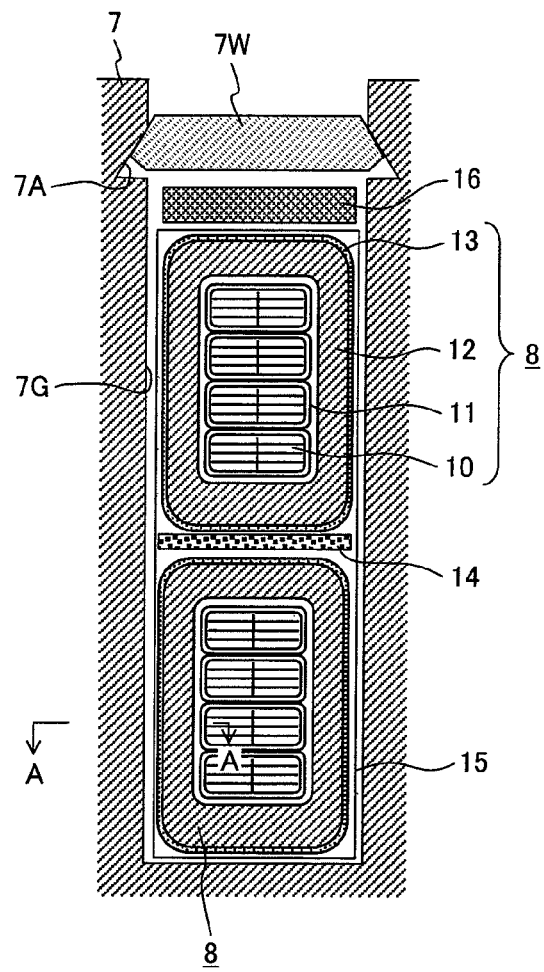
FIG. 1 is a cross-sectional view of a stator winding according to a first embodiment of the inventive rotating electrical machine.
Figure 2:
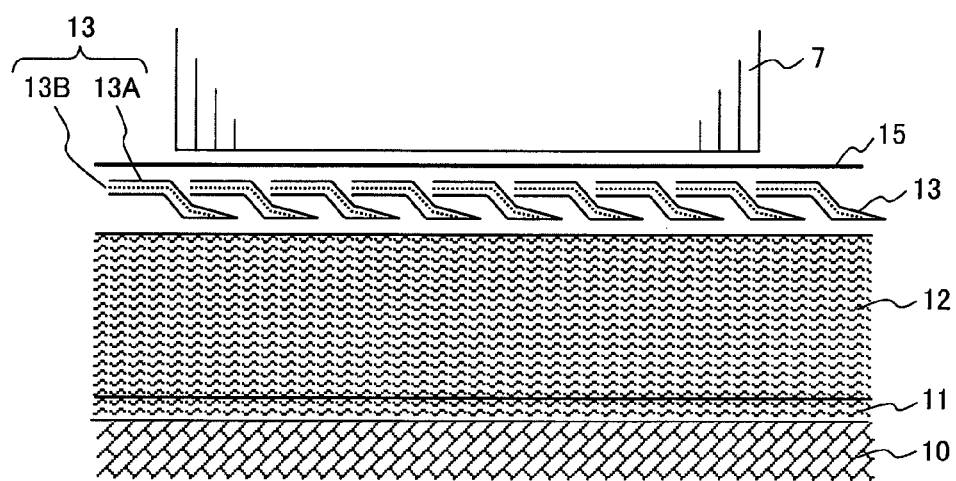
FIG. 2 is a horizontal cross-sectional view as taken along line A-A in FIG. 1.

As shown in FIGS. 1 and 2, the stator winding 8 is formed by forming an inter-layer insulating layer 11 by use of a well-known insulating material around each of a plurality of groups of the strand 10 in which strands are insulated by use of a well-known insulating material, forming a groundwall insulating layer 12 by use of a well-known insulating material around the plurality of groups of the strands 10, on which the inter-layer insulating layer 11 is formed, as a collection, and forming a semiconductive insulating layer 13 with a surface resistivity of approximately 1 kΩ around the groundwall insulating layer 12.

Two stator windings 8 structured as described above are stacked vertically, a slot packing 14 made of an insulating material being provided between them. Each of the stator windings 8 in this state is inserted into the slot 7G in the stator core 7 with a protective insulation 15 intervening therebetween, the protective insulation 15 being made of a well-known semiconductive insulating material having a surface resistivity almost the same as the semiconductive insulating layer 13. After the stator winding 8 has been inserted, the protective insulation 15 is lap-wound over the stator winding 8 so as to wrap it. An under-wedge slot packing 16 made of an insulating material is overlaid on the protective insulation 15, after which the wedge 7W is inserted into the wedge groove 7A.

The semiconductive insulating component used to form the semiconductive insulating layer 13 comprises a continuous semiconductive sheet 13A that is formed by blending carbon filler in, for example, a polyester nonwoven fabric and then coating the surface of the fabric with insulation resin in which carbon filler are mixed. The continuous semiconductive sheet 13A is center-folded, and its inside is coated with silicone resin, resulting in a thermal-stress relaxation layer 13B that is a non-adhesive layer. The continuous semiconductive sheet 13A formed in this way is lap-wound around the outer periphery of the groundwall insulating layer 12, forming the semiconductive insulating layer 13.

The insulation resin including carbon filler may be, for example, epoxy resin, polyester resin, or modified polyimide. The component to which carbon filler adhere is not limited to the polyester nonwoven fabric; a polyester fabric, a glass fabric, or the like may be used. The resin used to form the thermal stress relaxation layer 13B, which is a non-adhesive layer, may be fluorocarbon resin.

The stator winding 8 seated in the stator core 7 as described above is accommodated in a vacuum impregnated tank, and vacuum pressure impregnation is performed for an insulation resin solution such as an epoxy resin solution by a well-known procedure so that the insulation resin is impregnated in clearances in the slot 7G and the interior and exterior of each insulating layer. The impregnated insulation resin is then heated and cured, resulting in the stator 6 with no clearance between the stator core 7 and strand 10.

The stator winding 8 is integrated into the stator core 7 at the time when the insulation resin is impregnated, heated, and cured as described above. The strand 10, the insulating layers 11, 12, 13, and 15, and the stator core 7 then contract with different coefficients of thermal expansion during a process of cooling to the ordinary temperatures. Although thermal stress is caused due to the different coefficients of thermal expansion in the thickness direction of the insulating layers, the thermal stress is absorbed by the thermal stress relaxation layer 13B, which is a non-adhesive layer, in the semiconductive insulating layer 13. Accordingly, peeling and cracks do not occur in the groundwall insulating layer 12.

In the semiconductive insulating layer 13, peeling occurs in the non-adhesive layer of the thermal stress relaxation layer 13B, but the same electric potential can be kept above and below the peeled part of the non-adhesive layer because the center-folded continuous semiconductive sheet 13A is lap-wound and thereby electrical continuity is established. Accordingly, even when there is a peeled part, no corona discharge occurs there. The center-folded continuous semiconductive sheet 13A, which is lap-wound, is bonded mechanically continuously, so the continuous semiconductive sheet 13A does not become discontinuous. As a result, the groundwall insulating layer 12 is firmly bonded to the stator core 7, and a bearing force against the electromagnetic force exerted on the strand 10 can be assured. In this specification, when all the potential of the strand conductor 10 of the stator winding 8 are substantially same, the inter-layer insulating layer 11 means the strands insulating layer which insulates between the strands.

The above embodiment, in an aspect, consists of:

a rotating electrical machine in which a rotating electrical machine winding is formed by providing a groundwall insulating layer around the outer periphery of an insulating layer disposed on a conductor, the rotating electrical machine winding is inserted into a slot formed in a rotating electrical machine core with a protective insulation intervening therebetween, a wedge is inserted on an opening side of the slot so as to fix the rotating electrical machine winding, insulation resin is grobal impregnated into the rotating electrical machine winding and rotating electrical machine core, and the impregnated insulation resin is cured; wherein:

a semiconductive insulating layer is formed by wrapped taping a continuous semiconductive sheet, which is center-folded in a longitudinal direction thereof, between the groundwall insulating layer and the protective insulation; and a thermal stress relaxation layer is formed inside the center-folded semiconductive sheet, the thermal stress relaxation layer relaxation thermal stress exerted in a thickness direction of the insulating layers.

A second embodiment of the inventive rotating electrical machine will be described below with reference to FIGS. 4 and 5. The same structural members as in FIGS. 1 to 3 are assigned the same reference characters, and their details will not be explained again.

This embodiment differs from the first embodiment in that the semiconductive insulating layer 13 is disposed between the inter-layer insulating layer 11 and the groundwall insulating layer 12, a corona shield layer 17 is formed around the outer periphery of the groundwall insulating layer 12, and another protective insulation 18 is provided around the outer periphery of the corona shield layer 17.

The semiconductive insulating layer 13 has the same structure and is wound in the same way as in the first embodiment, so its detailed explanation will be omitted.

The corona shield layer 17 is formed by wrapped taping a polyester nonwoven fabric in which carbon filler are blended, the surface of the polyester nonwoven fabric being coated with insulation resin in which carbon filler are mixed. The insulation resin may be epoxy resin, polyester resin, modified polyimide, or the like. The nonwoven fabric is not limited to the polyester nonwoven fabric; a polyester fabric, a glass fabric, or the like may be used.

The protective insulation 18 comprises two continuous semiconductive sheets 18A and 18B, each of which is formed by blending carbon filler in, for example, a polyester nonwoven fabric and then coating the surface of the fabric with insulation resin in which carbon filler are mixed; a thermal stress relaxation layer 18C is formed between the two sheets, which is a non-adhesive layer coated with, for example, silicone resin. The thermal stress relaxation layer 18C is provided at both ends in the longitudinal direction of the slot 7G of the stator core 7, except the central part.

The stator winding 8 formed as described above, which is integrated into the stator core 7, is vacuum impregnated with insulation resin and heated to cure the insulation resin in the same way as in the first embodiment.

During a process of cooling to the ordinary temperatures, the different coefficients of thermal expansion of the different insulating layers cause thermal stress in the thickness direction of the insulating layers. However, the thermal stress is absorbed by the non-adhesive layer of the thermal stress relaxation layer 13B in the semiconductive insulating layer 13. Accordingly, peeling and cracks do not occur in the groundwall insulating layer 12.

The stator core 7, protective insulation 18, and corona shield layer 17 are firmly bonded at the central part in the longitudinal direction of the slot 7G, preventing the stator winding 8 from being displaced in the longitudinal direction of the slot 7G. Differences in coefficient of thermal expansion at both ends in the longitudinal direction of the slot 7G can be absorbed by the thermal stress relaxation layer 18C, which is a non-adhesive layer, in the protective insulation 18, so the groundwall insulating layer 12 is not deteriorated.

In the semiconductive insulating layer 13, peeling occurs in the non-adhesive layer of the thermal stress relaxation layer 13B, but the same electric potential can be kept above and below the peeled part of the non-adhesive layer because the center-folded continuous semiconductive sheet 13A is lap-wound and thereby electrical continuity is established. Accordingly, even when there is a peeled part, no corona discharge occurs there. The center-folded continuous semiconductive sheet 13A, which is lap-wound, is bonded mechanically continuously, so the continuous semiconductive sheet 13A does not become discontinuous, the strand 10 is firmly bonded to the stator core 7 through the groundwall insulating layer 12 and the like, and a bearing force against the electromagnetic force exerted on the strand 10 can be assured.

Figure 5:
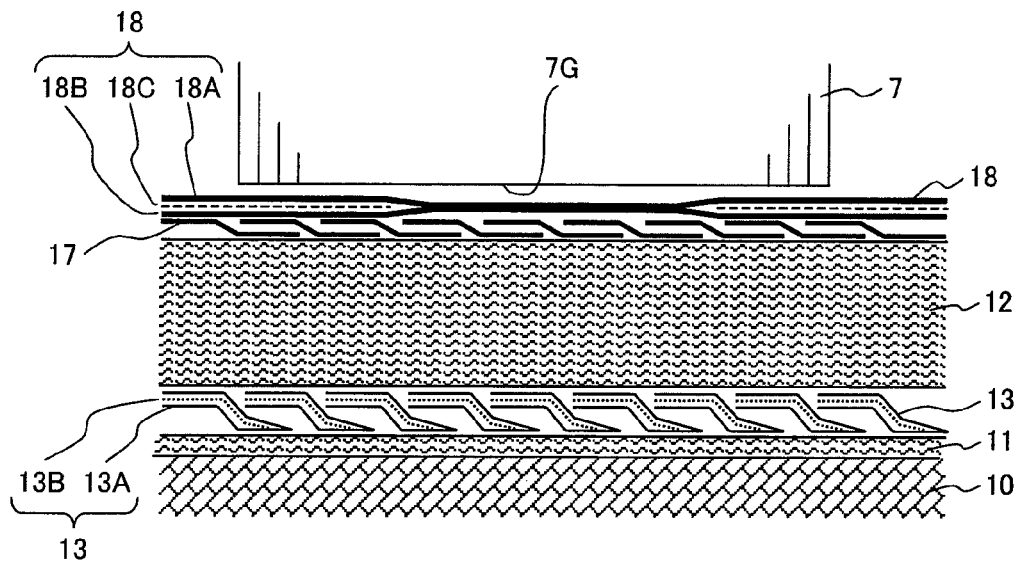
FIG. 5 is a horizontal cross-sectional view as taken along line B-B in FIG. 4.
Figure 6:
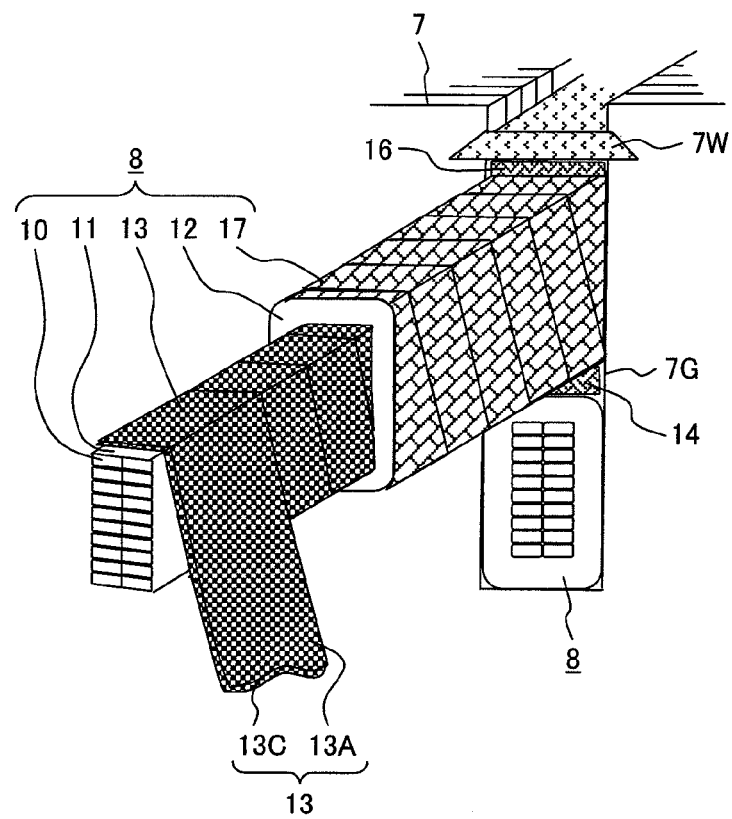
FIG. 6 is a vertical perspective view showing part of a stator winding according to a third embodiment of the inventive rotating electrical machine.

FIG. 6 illustrates a third embodiment of the inventive rotating electrical machine. The same structural members as in FIGS. 4 and 5 are assigned the same reference characters, and their details will not be explained again.

This embodiment differs from the second embodiment in that a thermal stress relaxation layer 13C, which is an elastic body comprising, for example, such as, silicone rubber in which carbon filler are mixed, is provided inside the center-folded continuous semiconductive sheet 13A.

In this embodiment as well, the same effect as in the above embodiments can be obtained.

Figure 7:
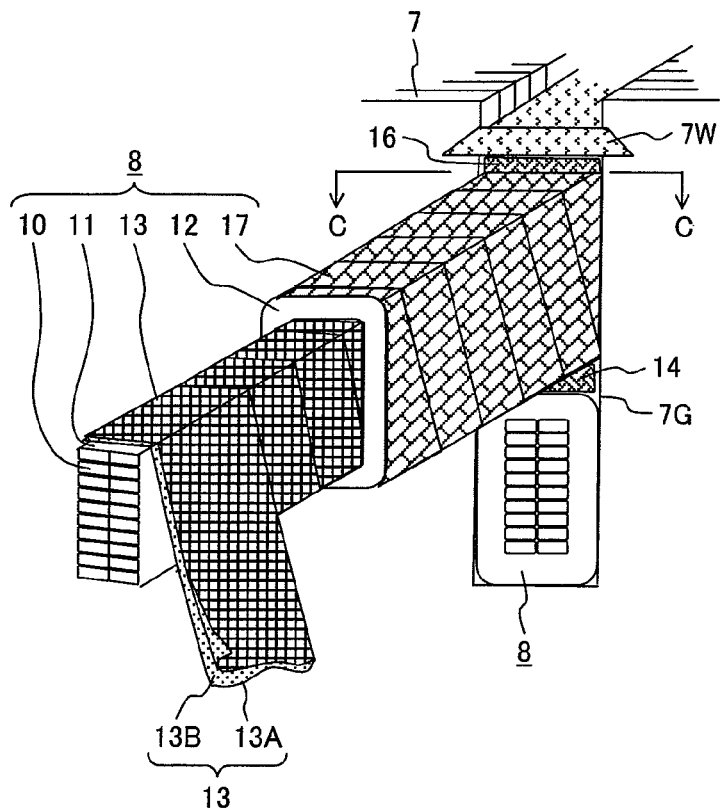
FIG. 7 is a vertical perspective view showing part of a stator winding according to a fourth embodiment of the inventive rotating electrical machine.
Figure 8:
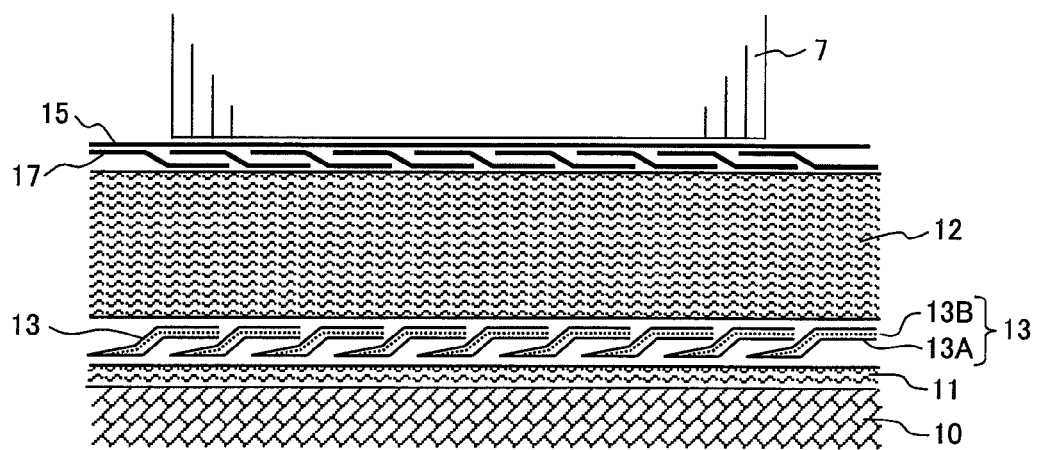
FIG. 8 is a horizontal cross-sectional view as taken along line C-C in FIG. 7.

FIGS. 7 and 8 illustrate a fourth embodiment of the inventive rotating electrical machine. The same structural members as in FIGS. 1 to 6 are assigned the same reference characters, and their details will not be explained again.

In this embodiment, the length of the slot 7G in the stator core 7 in its longitudinal direction is shorter than in the above embodiments. This embodiment is thus suitable when thermal stress exerted on each insulating layer in the longitudinal direction of the stator winding 8 is small and less affects the groundwall insulating layer 12.

To form the stator winding 8, an inter-layer insulating layer 11 is provided on the strand 10 to which strand insulating processing has been applied, a semiconductive insulating layer 13 is provided on the inter-layer insulating layer 11, a groundwall insulating layer 12 is provided on the semiconductive insulating layer 13, a corona shield layer 17 is provided on the groundwall insulating layer 12, and a protective insulation 15 is provided on the corona shield layer 17. The stator winding 8 seated in the stator core 7 is vacuum impregnated with insulation resin, and the impregnated insulation resin is then heated so as to be cured, in the same way as in the above embodiments.

In this embodiment as well, the same effect as in the above embodiments can be obtained.

Figure 9:
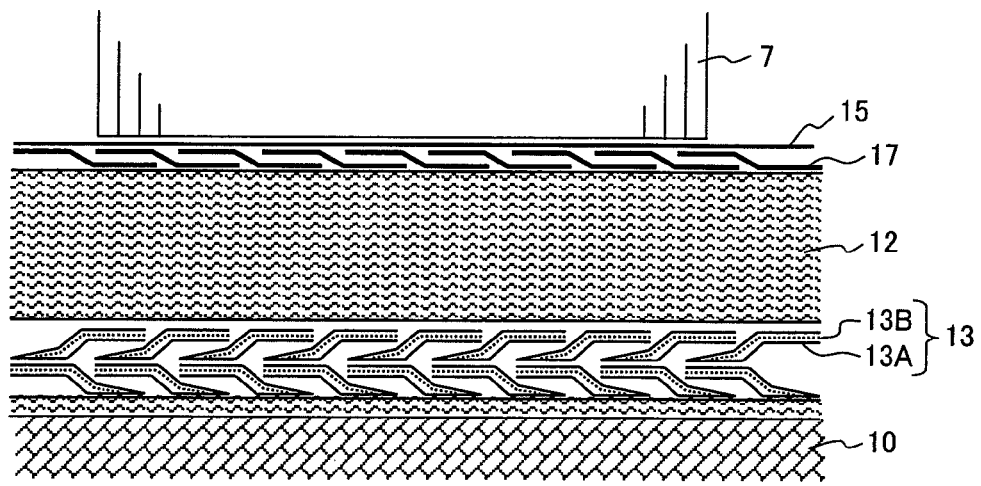
FIG. 9 illustrates a variation of FIG. 8.

FIG. 9 illustrates a variation of the fourth embodiment, in which two layers of the semiconductive insulating layer 13 are provided, the continuous semiconductive sheet 13A in one of the two layers being lap-wound in the reverse direction.

Since the continuous semiconductive sheet 13A are lap-wound in directions opposite to each other, the displacement of the thermal stress relaxation layer 13B in the semiconductive insulating layer 13, which is caused in the longitudinal direction of the stator winding 8 due to differences in thermal expansion and contraction among the strand 10, the insulating layers, and the stator core 7, can be evened at both ends in the longitudinal direction without being caused on only either side.

Figure 10:
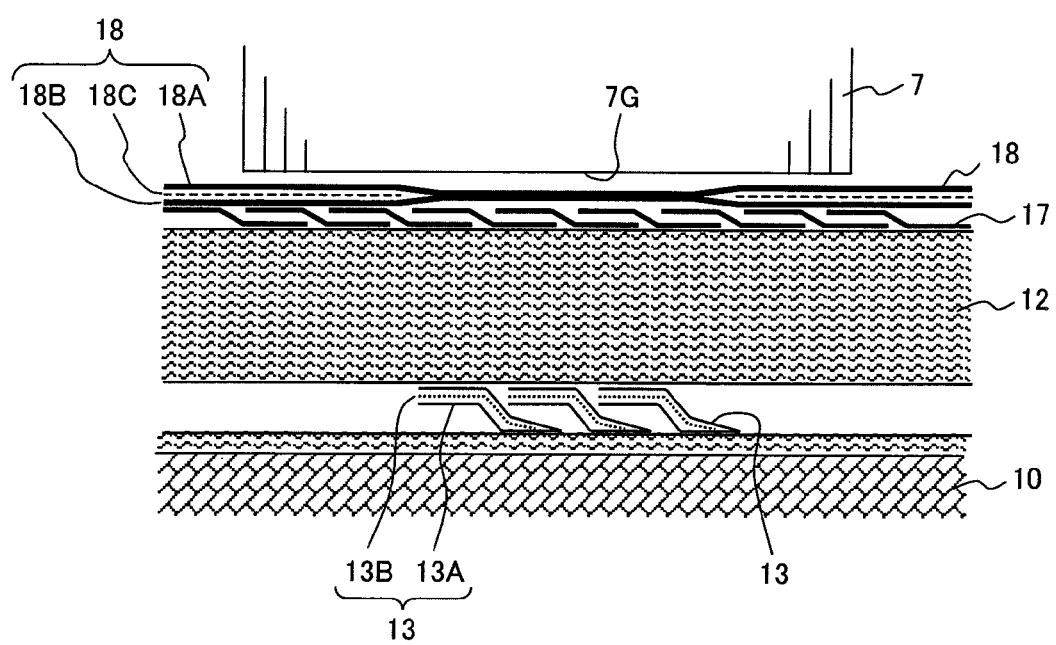
FIG. 10 illustrates a stator winding according to a fifth embodiment of the inventive rotating electrical machine, as in FIG. 8.

FIG. 10 illustrates a fifth embodiment of the inventive rotating electrical machine. The same structural members as in FIGS. 1 to 9 are assigned the same reference characters, and their details will not be explained again.

In this embodiment, the semiconductive insulating layer 13 is provided only at the central part in the longitudinal direction of the slot 7G in the stator winding 8, and the protective insulation 18 comprising the continuous semiconductive sheets 18A and 18B, which are stacked, includes the thermal stress relaxation layer 18C at both ends in the longitudinal direction of the slot 7G, except the central part.

This arrangement not only provides the same effect as in the above embodiments, but also eliminates two types of thermal stress; the thermal stress caused by differences in coefficient of thermal expansion in the thickness direction of the insulating layers is absorbed by the thermal stress relaxation layer 13B of the semiconductive insulating layer 13 and the thermal stress relaxation layer 18C of the protective insulation 18, and the thermal stress caused in the longitudinal direction of the slot 7G is absorbed by the thermal stress relaxation layer 18C of the protective insulation 18. Accordingly, the arrangement prevents the groundwall insulating layer 12 from being deteriorated.

Figure 11:
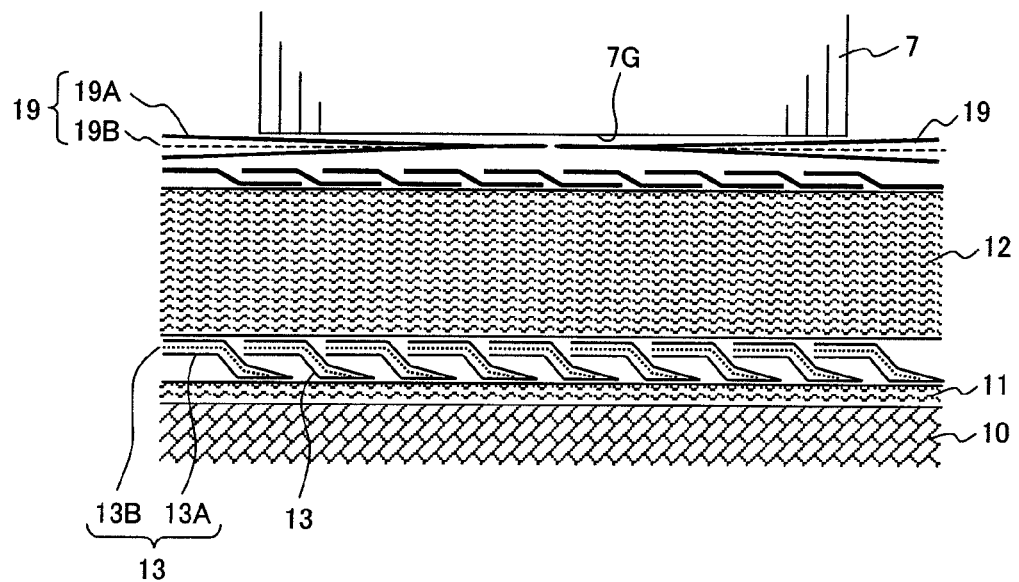
FIG. 11 illustrates a stator winding according to a sixth embodiment of the inventive rotating electrical machine, as in FIG. 10.

FIG. 11 illustrates a sixth embodiment of the inventive rotating electrical machine. The same structural members as in FIGS. 4 and 5 are assigned the same reference characters, and their details will not be explained again.

Figure 4:
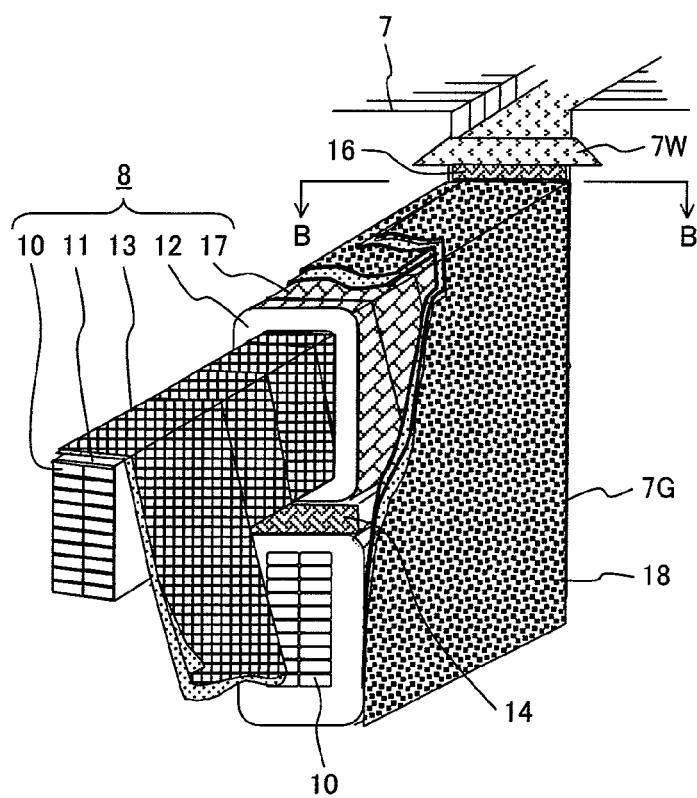
FIG. 4 is a vertical perspective view showing part of a stator winding according to a second embodiment of the inventive rotating electrical machine.

This embodiment is an improvement of the second embodiment illustrated in FIGS. 4 and 5. In the second embodiment, two continuous semiconductive sheets 18A and 18B are used as the protective insulation 18. In a protective insulation 19 in this embodiment, only one type of continuous semiconductive sheet 19A, which is center-folded, is used with a thermal stress relaxation layer 19B being provided inside. Two center-folded continuous semiconductive sheets 19A of this type are disposed so that the fold line of each continuous semiconductive sheet 19A is positioned at the central part in the longitudinal direction of the slot 7G.

The above arrangement enables the same effect as in the above embodiments to be obtained.

Figure 12:
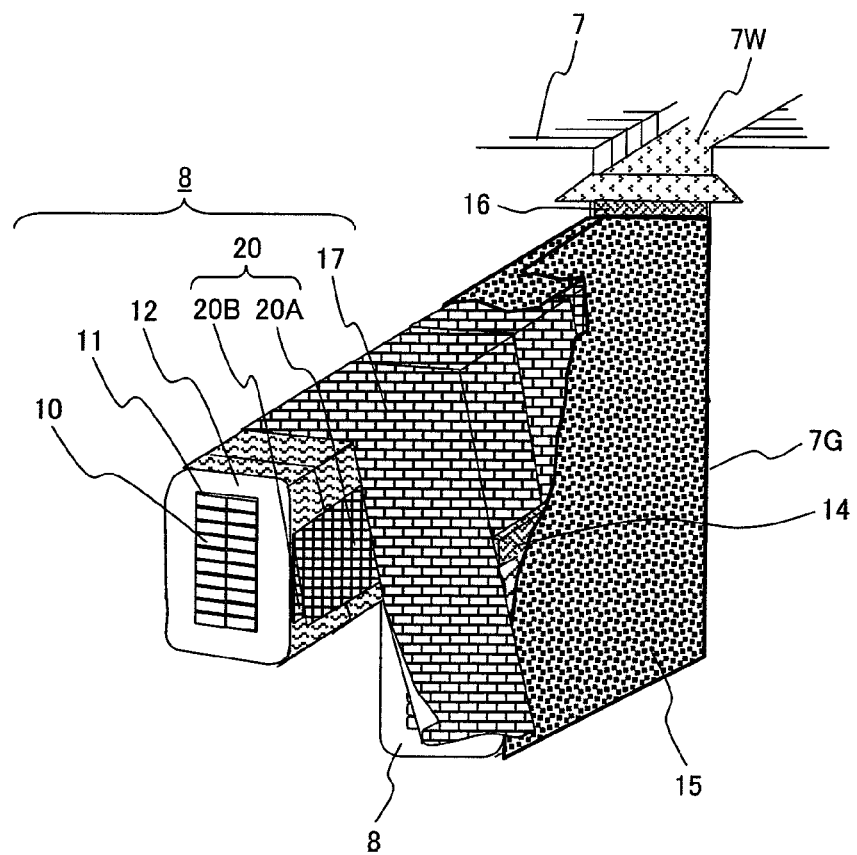
FIG. 12 illustrates a stator winding according to a seventh embodiment of the inventive rotating electrical machine, as in FIG. 7.

FIG. 12 illustrates a seventh embodiment of the inventive rotating electrical machine. The same structural members as in FIGS. 4 and 5 are assigned the same reference characters, and their details will not be explained again.

In this embodiment, a semiconductive insulating layer 20 disposed on the groundwall insulating layer 12 is provided only on a side facing one of two opposite surfaces of the slot 7G, along the longitudinal direction. The semiconductive insulating layer 20 comprises a continuous semiconductive sheet 20A, in which the same material and the same structure are used as in the continuous semiconductive sheet 13A in the above embodiments, and also includes a thermal stress relaxation layer 20B, which is disposed inside the continuous semiconductive sheet 20A and is a non-adhesive layer because the inside is coated with, for example, silicone resin. A corona shield layer 17 is formed by wrapping a semiconductive sheet around the outer periphery of the continuous semiconductive sheet 20A.

This arrangement not only provides the same effect as in the above embodiments, but also enables the groundwall insulating layer 12 to be firmly bonded to the stator core 7 because there is no thermal stress relaxation layer 20B on the side opposite to the side on which the semiconductive insulating layer 20 is disposed in the groundwall insulating layer 12. This bonding provides an effect that the strand 10 is stably held against the electromagnetic force.

Table 1 indicates measurements of the bonding strength in the shearing direction of the insulating layers in the rotating electrical machine in the first to seventh embodiments of the present invention.

TABLE 1

| Sample | First embodiment 1 | Second embodiment 2 | Third embodiment 3 | Fourth embodiment 4 | Fifth embodiment 5 | Sixth embodiment 6 | Seventh embodiment 7 | Conventional embodiment |
|---|---|---|---|---|---|---|---|---|
| Bonding strength (MPa) | 1.8 | 3.6 | 3.4 | 3.8 | 3.5 | 3.6 | 3.6 | 1.2 |

It can be confirmed from this result that all of the first to seventh embodiment provide an effect exceeding the bonding strength in the conventional example.

As described above, the present invention not only can prevent corona discharges attributable to peeling and cracks that occur during the curing of insulation resin but also can provide a rotating electrical machine winding that can be supported stably against an electromagnetic force and a rotating electrical machine using the rotating electrical machine winding.

The rotating electrical machine winding has been described just as an example of the stator winding of a power generator uses as a rotating electrical machine. However, it should be understood that the rotating electrical machine winding can also be used as the stator winding of a motor or the rotor winding of a power generator or motor.

Although the above description covers the rotating electrical machine winding that includes the inter-layer insulating layer 11, it can, of course, also apply to a rotating electrical machine winding that does not include the inter-layer insulating layer 11.

What is claimed is:

1. A rotating electrical machine winding in which a semiconductive insulating layer is formed by wrapped taping a semiconductive insulating component, wherein the semiconductive insulating component comprises a continuous semiconductive sheet that is center-folded in a longitudinal direction thereof and a thermal stress relaxation layer disposed inside the center-folded continuous semiconductive sheet, and wherein the continuous semiconductive sheet is formed by coating insulation resin in which carbon filler are mixed to an insulating component.

2. The rotating electrical machine winding according to claim 1, wherein the thermal stress relaxation layer is a non-adhesive layer.

3. The rotating electrical machine winding according to claim 2, wherein the non-adhesive layer is a coating layer formed by coating silicone resin to the insulating component.

4. The rotating electrical machine winding according to claim 2, wherein the non-adhesive layer is a coating layer formed by coating fluorocarbon resin to the insulating component.

5. The rotating electrical machine winding according to claim 1, wherein the thermal stress relaxation layer is an elastic body.

6. The rotating electrical machine according to claim 1, in which a rotating electrical machine winding is formed by providing a groundwall insulating layer around the outer periphery of a coil conductor, the rotating electrical machine winding is inserted into a slot formed in a rotating electrical machine core with a protective insulation intervening therebetween, a wedge is inserted on an opening side of the slot so as to fix the rotating electrical machine winding, insulation resin is grobal impregnated into the rotating electrical machine winding and rotating electrical machine core, and the impregnated insulation resin is cured; wherein:
　a semiconductive insulating layer is formed between the groundwall insulating layer and the protective insulation, the semiconductive insulating layer comprising a center-folded continuous semiconductive sheet disposed in a longitudinal direction thereof and a semiconductive sheet lap-wound outside the center-folded continuous semiconductive sheet; and
　a thermal stress relaxation layer is formed inside the center-folded semiconductive sheet, the thermal stress relaxation layer relaxation thermal stress exerted in a thickness direction of the insulating layers.

7. The rotating electrical machine winding according to claim 6, wherein the continuous semiconductive sheet is formed by coating insulation resin in which carbon filler are mixed to an insulating component.

8. The rotating electrical machine winding according to claim 7, wherein the thermal stress relaxation layer is a non-adhesive layer.

9. The rotating electrical machine winding according to claim 8, wherein the non-adhesive layer is a coating layer formed by coating silicone resin to the insulating component.

10. The rotating electrical machine winding according to claim 8, wherein the non-adhesive layer is a coating layer formed by coating fluorocarbon resin to the insulating component.

11. The rotating electrical machine winding according to claim 7, wherein the thermal stress relaxation layer is an elastic body.

12. A rotating electrical machine according to claim 1, in which a rotating electrical machine winding is formed by providing a groundwall insulating layer and a corona shield layer around the outer periphery of a strands insulating layer or an inter-layer insulating layer disposed on a coil conductor, the rotating electrical machine winding is inserted into a slot formed in a rotating electrical machine core with a protective insulation intervening therebetween, a wedge is inserted on an opening side of the slot so as to fix the rotating electrical machine winding, insulation resin is grobal impregnated into the rotating electrical machine winding and rotating electrical machine core, and the impregnated insulation resin is cured; wherein:
　a semiconductive insulating layer is formed by wrapped taping a continuous semiconductive sheet, which is center-folded in a longitudinal direction thereof, between the strands insulating layer or the inter-layer insulating layer and the protective insulation; and
　a thermal stress relaxation layer is formed inside the center-folded semiconductive sheet, the thermal stress relaxation layer relaxation thermal stress exerted in a thickness direction of the insulating layers.

13. A rotating electrical machine according to claim 1, in which a rotating electrical machine winding is formed by providing a groundwall insulating layer and a corona shield layer around the outer periphery of a strands insulating layer or an inter-layer insulating layer disposed on a coil conductor, the rotating electrical machine winding is inserted into a slot formed in a rotating electrical machine core with a protective insulation intervening therebetween, a wedge is inserted on an opening side of the slot so as to fix the rotating electrical machine winding, insulation resin is grobal impregnated into the rotating electrical machine winding and rotating electrical machine core, and the impregnated insulation resin is cured; wherein:
　a semiconductive insulating layer is formed by wrapped taping a continuous semiconductive sheet, which is center-folded in a longitudinal direction thereof, between the groundwall insulating layer and the inter-layer insulating layer or the strands insulating layer; and
　a thermal stress relaxation layer is formed inside the center-folded semiconductive sheet, the thermal stress relaxation layer relaxation thermal stress exerted in a thickness direction of the insulating layers.

14. The rotating electrical machine winding according to claim 13, wherein:
　the semiconductive insulating layer has a silicone resin layer inside the continuous semiconductive sheet, which is center-folded in the longitudinal direction; and
　two layers of the semiconductive insulating layer are provided, the continuous semiconductive sheet in one of the two layers being lap-wound in a reverse direction.

15. A semiconductive insulating component used to form a semiconductive insulating layer on a rotating electrical machine winding, the component comprising:
　a continuous semiconductive sheet that is center-folded in a longitudinal direction thereof; and
　a thermal stress relaxation layer disposed inside the center-folded continuous semiconductive sheet;
　wherein the continuous semiconductive sheet is formed by coating insulation resin in which carbon filler are mixed to an insulating component.

16. The semiconductive insulating component according to claim 15, wherein the thermal stress relaxation layer is a non-adhesive layer.

17. The semiconductive insulating component according to claim 16, wherein the non-adhesive layer is a coating layer formed by coating silicone resin to the insulating component.

18. The semiconductive insulating component according to claim 16, wherein the non-adhesive layer is a coating layer formed by coating fluorocarbon resin to the insulating component.

19. The semiconductive insulating component according to claim 15, wherein the thermal stress relaxation layer is an elastic body.

\* \* \* \* \*